US011245636B2

(12) United States Patent
Tortosa et al.

(10) Patent No.: US 11,245,636 B2
(45) Date of Patent: Feb. 8, 2022

(54) DISTRIBUTING COMPUTING RESOURCES BASED ON LOCATION

(71) Applicant: International Business Machines Corporation, Armonk, NY (US)

(72) Inventors: Andrea Tortosa, Rome (IT); Vinicio Bombacino, Rome (IT); Elisabetta Rinaldi, Rome (IT); Gianluca Bernardini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/577,158

(22) Filed: Sep. 20, 2019

(65) Prior Publication Data
US 2021/0092071 A1    Mar. 25, 2021

(51) Int. Cl.
*H04L 12/911* (2013.01)
*H04L 29/08* (2006.01)
*H04W 4/029* (2018.01)
*G06F 3/06* (2006.01)
*G06F 9/50* (2006.01)

(52) U.S. Cl.
CPC ............ *H04L 47/70* (2013.01); *G06F 3/0619* (2013.01); *G06F 3/0683* (2013.01); *G06F 9/505* (2013.01); *H04L 67/18* (2013.01); *H04W 4/029* (2018.02); *G06F 2209/502* (2013.01)

(58) Field of Classification Search
CPC ...... H04L 47/70; H04W 4/029; G06F 3/0619; G06F 3/0683; G06F 9/505
See application file for complete search history.

(56) References Cited

U.S. PATENT DOCUMENTS 9,514,180 B1 * 12/2016 Cadarette ............ G06F 16/2358
9,712,402 B2    7/2017 Rosensweig
9,858,166 B1 *  1/2018 Gong .................. G06F 11/3447
9,959,104 B2    5/2018 Chen
(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — William G Trost, IV
*Assistant Examiner* — Monishwar Mohan
(74) *Attorney, Agent, or Firm* — Randy E. Tejeda (57) ABSTRACT

Aspects of the present invention disclose a method, computer program product, and system for managing geographic locations of resources utilized to operate and support a workload. The method includes one or more processors identifying a request. Processing resources of a first network accessible computing system, located at a first geographic location, are allocated to execute the request. The method further includes determining an originating geographic location of the request and determining parameters for executing the request. The method further includes identifying a second network accessible computing system based on the parameters. The second network accessible computing system is located at a second geographic location associated with the originating geographic location of the request. The method further includes determining whether to relocate at least a portion of processing resources allocated to execute the request from the first network accessible computing system to the second network accessible computing system.

20 Claims, 6 Drawing Sheets

(56) References Cited

U.S. PATENT DOCUMENTS

| | | | |
|---|---|---|---|
| 9,986,031 B2 | 5/2018 | Jain | |
| 10,154,091 B1 | 12/2018 | Flaherty | |
| 2006/0059492 A1* | 3/2006 | Fellenstein | G06F 9/5072 |
| | | | 718/104 |
| 2011/0261842 A1* | 10/2011 | Beili | H04L 7/0083 |
| | | | 370/503 |
| 2013/0067079 A1* | 3/2013 | Mourtada | G06F 15/173 |
| | | | 709/225 |
| 2013/0346543 A1* | 12/2013 | Benantar | G06F 9/5055 |
| | | | 709/217 |
| 2014/0047342 A1* | 2/2014 | Breternitz | G06F 9/5061 |
| | | | 715/735 |
| 2014/0188451 A1* | 7/2014 | Asahara | H04L 45/38 |
| | | | 703/13 |
| 2015/0213044 A1* | 7/2015 | Sparenberg | G06F 16/14 |
| | | | 707/823 |
| 2016/0182588 A1* | 6/2016 | Luo | G06F 16/284 |
| | | | 709/219 |
| 2016/0371108 A1* | 12/2016 | Madtha | H04L 67/10 |
| 2017/0171105 A1* | 6/2017 | Baptist | H04L 67/10 |
| 2017/0222799 A1* | 8/2017 | Telford | H04L 9/3247 |
| 2017/0293994 A1* | 10/2017 | Li | G06F 9/5083 |
| 2018/0219955 A1* | 8/2018 | Chen | H04L 41/0896 |
| 2018/0239536 A1* | 8/2018 | Koppolu | G06F 3/0683 |
| 2019/0190785 A1* | 6/2019 | Power | H04L 47/762 |
| 2019/0229915 A1* | 7/2019 | Digiambattista | H04L 9/321 |
| 2020/0019841 A1* | 1/2020 | Shaabana | G06N 3/08 |
| 2020/0380056 A1* | 12/2020 | Morris | G06F 16/9537 |

* cited by examiner

DISTRIBUTING COMPUTING RESOURCES BASED ON LOCATION

BACKGROUND OF THE INVENTION

The present invention relates generally to the field of workload management, and more particularly to reallocating computing resources based on geographic usage information.

In computing, a virtual machine (VM) is an emulation of a computer system. Virtual machines are based on computer architectures and provide functionality of a physical computer and can involve specialized hardware, software, or a combination. System virtual machines (e.g., full virtualization VMs) can provide a substitute for a real machine, such as the functionality to execute entire operating systems. Process virtual machines are designed to execute computer programs in a platform-independent environment.

Containerization has become a major trend in software development as an alternative or companion to virtualization. Containerization involves encapsulating or packaging up software code and all its dependencies so that it can run uniformly and consistently on any infrastructure. Containerization allows developers to create and deploy applications faster and more securely. For example, when a developer transfers code from a desktop computer to a virtual machine (VM) or from a one operating system to a different operating system. Containerization eliminates this problem by bundling the application code together with the related configuration files, libraries, and dependencies required for it to run. This single package of software, or "container," is abstracted away from the host operating system, and hence, stands alone and becomes portable—able to run across any platform or cloud.

SUMMARY

Aspects of the present invention disclose a method, computer program product, and system for managing the geographic location of resources (e.g., virtual machines (VMs), containers, etc.) that are utilized to operate and support a workload. The method includes one or more processors identifying a request. Processing resources of a first network accessible computing system, located at a first geographic location, are allocated to execute the identified request. The method further includes one or more processors determining an originating geographic location of the identified request. The method further includes one or more processors determining parameters for executing the identified request. The method further includes one or more processors identifying a second network accessible computing system based on the determined parameters. The second network accessible computing system is located at a second geographic location that is associated with the determined originating geographic location of the identified request. The method further includes one or more processors determining whether to relocate at least a portion of processing resources allocated to execute the identified request from the first network accessible computing system to the second network accessible computing system.

DETAILED DESCRIPTION

Embodiments of the present invention allow for managing the geographic location of resources (e.g., virtual machines (VMs), containers, etc.) that are utilized to operate and support a workload. In various embodiments of the present invention, a workload can be representative of process and/or service that utilizes remotely located processing resources (e.g., network accessible VMs, containers, etc.), such as issue resolution services, collaboration applications, messaging forums, etc.

Embodiments of the present invention determine an originating geographic location of incoming data associated with a workload (e.g., messaging application, incident reporting tool or service, etc.). Additional embodiments of the present invention determine whether to relocate processing resources that support the workload, based on the geographic location and the incoming data. Accordingly, in response to determining to relocate processing resources, embodiments of the present invention can relocate processing resources from an initial computing system to a computing system that is in a geographic location that reduces processing latency.

Some embodiments of the present invention recognize that many services and applications utilize network accessible resources, such as VMs and containers. Advances scheduling can involve configuring a pod (e.g., a group of VMs or containers that operate together) to run on a particular node (e.g., server), or have a preference to run on a particular node. Embodiment of the present invention recognize that utilizing such constraints are not always necessary when scheduling resource usage and node placement. Further embodiments of the present invention recognize that to address specific needs (e.g., high availability requirements for a workload), multiple pod instances can be deployed across multiple different geographic locations.

Various embodiments of the present invention provide advantages based on dynamically relocating processing resources so that an application or workload is supported by processing resources that are located in geographic proximity to active user, thus reducing latency. Accordingly, embodiments of the present invention dynamically manage deployment of resources based on aggregating real-time usage data for a workload and application, while the workload or application is serving multiple geographies.

Implementation of embodiments of the invention may take a variety of forms, and exemplary implementation details are discussed subsequently with reference to the Figures.

Figure 1:
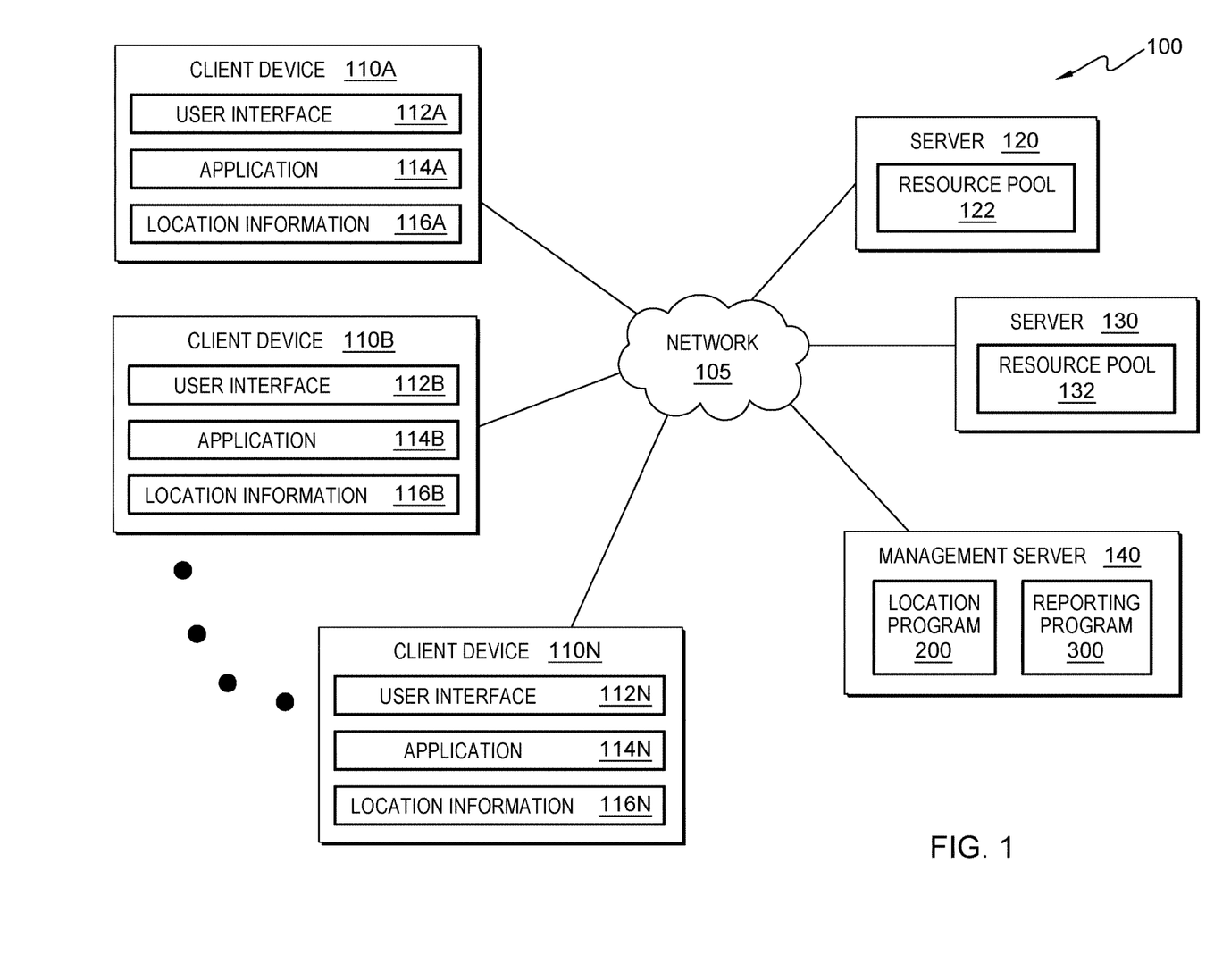
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110A, client device 110B through client device 110N, server 120, server 130, and management server 140, all interconnected over network 105. In an example embodiment, client devices 110A through 110N are associated with a workload that can utilize resources of server 120 and server 130. In this example embodiment, management server 140 manages the workload (e.g., messaging service, indicant reporting application, etc.) and dynamically allocates resources to perform and operate the workload (e.g., utilizing location program 200 and reporting program 300) to reduce latency of the workload, in accordance with various embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110A through client device 110N, server 120, server 130, management server 140, in accordance with embodiments of the present invention. In various embodiments, network 105 facilitates communication among a plurality of networked computing devices (e.g., client device 110A through client device 110N), corresponding users (e.g., respective individuals utilizing client device 110A through client device 110N), processing resources (e.g., server 120 and server 130) and corresponding management services (e.g., management server 140).

In various embodiments of the present invention, client device 110A through client device 110N may be a workstation, personal computer, personal digital assistant, mobile phone, or any other device capable of executing computer readable program instructions, in accordance with embodiments of the present invention. In general, client device 110A through client device 110N are representative of any electronic device or combination of electronic devices capable of executing computer readable program instructions. Client device 110A through client device 110N may include components as depicted and described in further detail with respect to FIG. 4, in accordance with embodiments of the present invention. In an example scenario, a user of client device 110A posts a message on a messaging service application that is supported by management server 140. In another example scenario, a user of client device 110B reports an issue to an incident reporting service that is managed by management server 140.

Client device 110A includes user interface 112A, application 114A, and location information 116A. User interface 112A is a program that provides an interface between a user of client device 110A and a plurality of applications that reside on the computing device (e.g., application 114A). A user interface, such as user interface 112A, refers to the information (such as graphic, text, and sound) that a program presents to a user, and the control sequences the user employs to control the program. A variety of types of user interfaces exist. In one embodiment, user interface 112A is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112A is a script or application programming interface (API).

Application 114A can be representative of one or more applications (e.g., an application suite) that operate on client device 110A. In an example embodiment, application 114A is a client-side application of an enterprise associated with management server 140 (e.g., messaging application, incident reporting application, etc.). In another example embodiment, application 114A is a web browser that an individual utilizing client device 110A utilizes (e.g., via user interface 112A) to access and provide information over network 105, such as sending messages to a messaging application hosted by management server 140. In other aspects of the present invention, application 114A can be representative of applications that provide additional functionality (e.g., camera, messaging, etc.), in accordance with various aspects of the present invention.

Location information 116A is representative of data that indicates a geographic location of a respective device, in accordance with embodiments of the present invention. In various embodiments, a user associated with a computing device (e.g., client device 110A through 110N) can define a level of detail tracked location information. For example, a user of client device 110A can define that location information 116A includes an indication of the country in which client device 110A is located. In another example, a user of client device 110B can define that location information 116B includes geographic coordinates of client device 110B. In example embodiments, client device 110A includes a global positioning system (GPS) that populates location information 116A with real-time location data of client device 110A.

In additional aspects of the present invention, client device 110B through client device 110N includes respective instances of user interface 112B through user interface 112N, application 114B through application 116N, and location information 116B through location information 116N. The respective instances of user interface 112B through user interface 112N, application 114B through application 116N, and location information 116B through location information 116N include functionality as described above, with regard to respective instances of user interface 112A and application 114A. In an example embodiment, client device 110A through client device 110N are personal computing devices registered to utilize a service provided by management server 140 (e.g., messaging application, incident reporting, etc.).

In example embodiments, server 120 and server 130 can be a desktop computer, a computer server, or any other computer systems, known in the art. In certain embodiments, server 120 and server 130 represents computer systems utilizing clustered computers and components (e.g., database server computers, application server computers, VMs, containers, etc.) that act as a single pool of seamless resources when accessed by elements of data processing environment 100 (e.g., client device 110A through 110N and management server 140). In general, server 120 and server 130 is representative of any electronic device or combination of electronic devices capable of executing computer readable program instructions. Server 120 and server 130 may include components as depicted and described in further detail with respect to FIG. 4, in accordance with embodiments of the present invention.

In various embodiments of the present invention, server 120 is located in a different geographic location than server 130. In a further embodiment, server 120 and server 130 can operate as one or more computing nodes in a cloud computing environment (described in further detail with regard to FIG. 5 and FIG. 6), providing processing resources in accordance with embodiments of the present invention.

Server 120 includes resource pool 122 and server 130 includes resource pool 132. In various embodiments of the present invention, server 120 and server 130 provide hardware and software resources to support and operate services and workloads. Resource pool 122 and resource pool 132 include hardware and software resources. In an example embodiment, resource pool 122 and resource pool 132 include hardware resources that management server can dynamically provision, such as central processing units (CPUs), memory, storage devices, etc. In another example embodiment, resource pool 122 and resource pool 132 include software resources that management server can dynamically provision, such as VMs and containers. In a further embodiment, resource pool 122 and resource pool 132 include a combination of hardware and software resources that management server can dynamically provision.

In example embodiments, management server 140 can be a desktop computer, a computer server, or any other computer systems, known in the art. In certain embodiments, management server 140 represents computer systems utilizing clustered computers and components (e.g., database server computers, application server computers, etc.) that act as a single pool of seamless resources when accessed by elements of data processing environment 100 (e.g., client device 110A through 110N, server 120, and server 130). In general, management server 140 is representative of any electronic device or combination of electronic devices capable of executing computer readable program instructions. Management server 140 may include components as depicted and described in further detail with respect to FIG. 4, in accordance with embodiments of the present invention. In a further embodiment, management server 140 can operate as one or more computing nodes in a cloud computing environment (described in further detail with regard to FIG. 5 and FIG. 6), in accordance with embodiments of the present invention.

Management server 140 includes location program 200 and reporting program 300. In various embodiments of the present invention, management server 140 utilizes location program 200 and reporting program 300 to dynamically manage resource deployment server 120 and server 130. In an example embodiment, management server 140 manages the deployment of resources (e.g., VMs, containers, etc.) that perform processing in support of a workload, such as a hosted messaging application.

In example embodiments, management server 140 includes information associated with registered users (e.g., users of client device 110A through client device 110N) and utilizes information associated with registered users of an application or service that management server 140 manages (via location program 200 and/or reporting program 300). For example, an individual utilizing client device 110A completes a registration process, provides information, and authorizes the collection and analysis (i.e., opts-in) of relevant data, by management server 140 (e.g., location information). In various embodiments, a user can opt-in or opt-out of certain categories of data collection. For example, during registration for an application or service that is managed by management server 140, a user (e.g., a user of client device 110B) can define which data is available for management server 140 to access and utilize.

Location program 200 determines whether to relocate processing resources associated with a workload, in accordance with an embodiment of the present invention. In various embodiments, identifies a request for processing data in a workload, such as a message sent to be posted in a messaging application. Location program 200 utilizes an originating geographic location and a size of the received request to determine a location processing score, for the originating location. In response to determining that the location processing score meets or exceeds a defined value, location program 200 relocates processing resources of the workload. For example, location program 200 utilizes dynamic deployment capabilities of management server 140 to provision VMs and containers in resource pool 132 of server 130, if server 130 is in closer geographic proximity to the originating location than server 120.

Reporting program 300 determines whether to relocate processing resources associated with supporting a client impact event, in accordance with an embodiment of the present invention. In various embodiments, reporting program 300 receives information associated with a client impact event, such as a submission of an issue to an incident reporting application. For example, a user of client device 110N reports to management server that a cloud service is not operating properly. Reporting program 300 can determine whether the client impact event indicates that specific users and/or components are needed and whether to relocate corresponding processing resources. In response to determining that the users or components associated with a specific location are needed and to relocate the processing resources, location program 200 relocates processing resources of the workload. For example, reporting program 300 utilizes dynamic deployment capabilities of management server 140 to provision VMs and containers in resource pool 132 of server 130, if server 130 is in closer geographic proximity to the specific location (i.e., corresponding to the users and components) than server 120.

Figure 2:
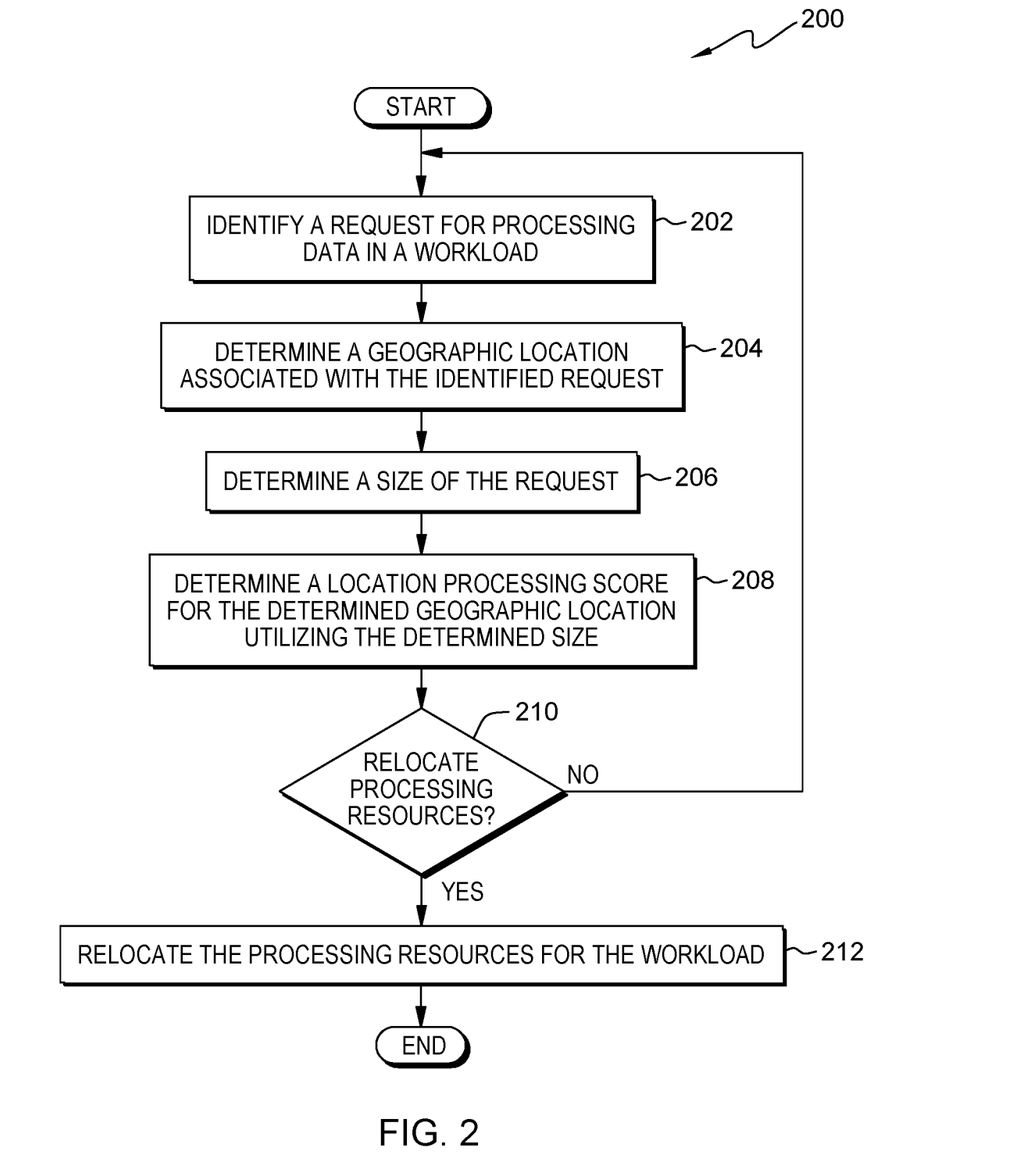
FIG. 2 is a flowchart depicting operational steps of a program for determining whether to relocate processing resources associated with a workload, in accordance with an embodiment of the present invention.

FIG. 2 is a flowchart depicting operational steps of location program 200, a program for determining whether to relocate processing resources associated with a workload, in accordance with an embodiment of the present invention. In one embodiment, location program 200 initiates in response to receiving data that corresponds to a service that management server 140 manages. For example, location program 200 initiates in response to receiving a message, from a user of client device 110A, to post on a messaging application associated with management server 140.

In step 202, location program 200 identifies a request for processing data in a workload. In one embodiment, location program 200 identifies a request for utilization of a service that is associated with management server 140. In example embodiments, location program 200 identifies a request sent by a user, such as a user utilizing client device 110A, the request including data associated with an application managed by management server 140. In various embodiments of the present invention, a workload can be representative of process and/or service that utilizes remotely located processing resources (e.g., network accessible VMs, containers, etc.), such as issue resolution services, collaboration applications, messaging forums, etc. In another embodiment, management server 140 is associated with managing resource deployment for the workload, which initially utilizes one or more VMs and/or containers in resource pool 122 of server 120.

In an example scenario, a user utilizing client device 110A posts a message to a messaging application (e.g., via application 114A). Management server 140 is associated with the messaging application and (via location program 200) identifies the message as a request to process data in a workload, the workload being the messaging application. In this example scenario, the messaging application utilizes one or more VMs and containers that server 120 hosts in resource pool 122 (i.e., the messaging application is a workload of server 120, managed by management server 140).

In step 204, location program 200 determines a geographic location associated with the identified request. In one embodiment, location program 200 determines location information corresponding to an originating location of the request, such as a geographic location of a computing device that sent the request. For example, a user utilizing client device 110A posts a message to a messaging application. In this example, location program 200 identifies location information 116A and determines the corresponding geographic location of client device 110A. In various embodiments, location program 200 can utilize a range of levels of specificity for the determined geographic location, such as a geographic region (e.g., state, county, time zone, etc.), a country (e.g., Japan, India, United States, etc.).

In another embodiment, location program 200 identifies a device that sent the identified request (of step 202) and sends a location query to the identified device to determine the geographic location of the device. In an additional embodiment, location program 200 can analyze identification information associated with a device that sent the identified request (of step 202) to derive a geographic location of the device (e.g., based on a source ID). In a further embodiment, an indication of the originating geographic location is included in the identified request.

In step 206, location program 200 determines a size of the request. In one embodiment, location program 200 determines a size of the data that the identified request (of step 202) adds to the workload. For example, location program 200 determines a file size of the message posted by the user of computing device 110A based on an evaluation of the content of the message (e.g., image size, text, etc.).

In step 208, location program 200 determines a location processing score for the determined geographic location utilizing the determined size. In one embodiment, location program 200 determines a location processing score for the determined geographic location (of step 204) by incrementing an existing score with the determined size of the request (from step 206). In various embodiments, the location processing score can be any metric that location program 200 can utilize to track an amount of processing that is occurring on data that originates from a particular location. For example, location program 200 maintains a record of location processing scores for each country that includes devices that contribute to the workload (i.e., send data for processing).

In one example, location program 200 utilizes the amount of data processed (over a defined period of time) that is received from an originating geographic location as the location processing score. In this example, location program 200 determines a size of the request to be 1 Gigabyte (GB) and that the existing location processing score for the geographic location is 5 GB. Accordingly, location program 200 determines the location score for the geographic location to be 6 GB. In additional example embodiments, location program 200 utilizes the determined size of the request (from step 206) as a weighting factor when determining the location processing score.

In decision step 210, location program 200 determines whether to relocate processing resources that support the workload. In one embodiment, location program 200 determines whether to dynamically reallocate processing resources that support the workload based on the determined location processing score (of step 208). In example embodiments, location program 200 compares the location processing scores for each respective location that includes devices that contribute to the workload. Location program 200 can identify a current processing location of the workload, such as resource pool 122 on server 120. In response to determining that a location processing score for a particular geographic location meets a defined condition, location program determines to relocate the processing resources. Location program 200 can utilize a variety of defined conditions, such as a score threshold, a score ratio of one location relative to another location, an amount of data, etc.

In various embodiments, location program 200 can identify a processing location that is in geographic proximity to the determined geographic location of step 204. In an example scenario, server 120 is located in Japan and supports the workload utilizing VMs and containers from resource pool 122, while users in Japan are providing processing requests for the workload. As time progresses, location program 200 receives processing requests from Germany and accordingly maintains respective location processing scores for Japan and Germany (e.g., through multiple iterations of steps 202 through 208). In this example scenario, server 130 is located in (or in geographic proximity to) Germany. Location program 200 analyzes the relationship of the respective location processing scores for Japan and Germany to determine whether to relocate the processing resources (e.g., from server 120 to server 130). For example, location program 200 tracks the ratio of location processing score of Germany relative to Japan, to determine when the ratio meets or exceeds a defined threshold condition (e.g., 25% in Germany and 75% in Japan, 50/50 split, etc.).

In response to determining to not relocate processing resources (decision step 210, NO branch), location program 200 returns to the start and waits for another request for data processing (i.e., waits for another instance of step 202). For example, location program 200 determines that a ratio location processing scores does not meet a defined threshold condition. In an alternate embodiment, in response to determining to not relocate processing resources (decision step 210, NO branch), location program 200 ends.

In step 212, location program 200 relocates the processing resources for the workload. More specifically, in response to determining to relocate processing resources (decision step 210, YES branch), location program 200 dynamically reallocates processing resources of the workload across geographic locations. In one embodiment, location program 200 identifies processing location (e.g., server 130) that is in geographic proximity (e.g., based on location information, latency, etc.) to a geographic location with a corresponding location processing score that exceeds a threshold condition. Location program 200 can then relocate at least some (or all) of the processing resources that support the workload to the identified processing location. For example, in response to determining to relocate processing resources, location program 200 relocates a portion of the VMs and containers that support a workload from resource pool 122 on server 120 to resource pool 132 on server 130.

In an example scenario (discusses previously with regard to decision step 210), server 120 is located in Japan and supports a workload utilizing VMs and containers from resource pool 122, while users in Japan are providing processing requests for the workload. Server 130 is located in Germany is capable of supporting the workload utilizing VMs and containers from resource pool 132. Location program 200 tracks the ratio of location processing score of Germany relative to Japan and determines that over the last five hours for the workload, server 120 has processed 6 GB of data originating from Japan and processed 4 GB of data originating from Germany (i.e., the respective location processing scores).

Accordingly, in this example scenario location program 200 determines to relocate processing resources for the workload (decision step 310, YES branch). Location program 200 can determine that server 130 is the processing location with the least latency between originating locations of data processing requests in Germany. In this scenario, location program 200 dynamically reallocates processing resources (e.g., VMs and containers) based on the ratio of workload processing (e.g., based on respective location processing scores) between Japan and Germany. Accordingly, location program 200 allocates and provisions 40% of the processing resources (e.g., VMs and containers) to resource pool 132 in server 130 (located in Germany) and allocates and provisions 60% of the processing resources (e.g., VMs and containers) to resource pool 122 in server 120 (located in Japan).

In an alternate aspect of the example scenario, location program 200 tracks the ratio of location processing score of Germany relative to Japan and determines that over the last five hours for the workload, server 120 has processed 3 GB of data originating from Japan and processed 7 GB of data originating from Germany. In this aspect, location program 200 can dynamically reallocate all processing resources (e.g., VMs and containers) from resource pool 122 in server 120 (located in Japan) to resource pool 132 in server 130 (located in Germany), based on system or application preferences.

Figure 3:
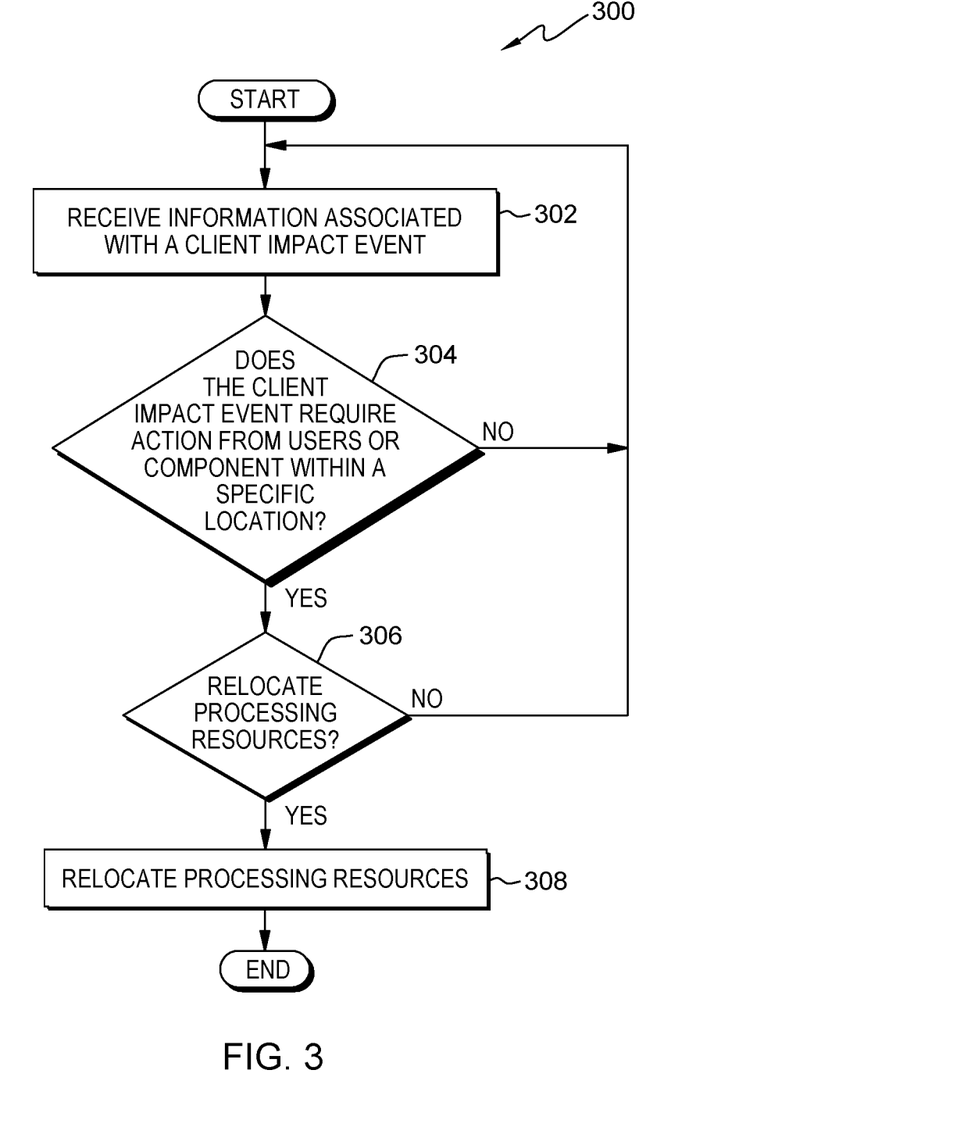
FIG. 3 is a flowchart depicting operational steps of a program for determining whether to relocate processing resources associated with supporting a client impact event, in accordance with an embodiment of the present invention.

Embodiments of the present invention recognize that a production environment includes clusters of VMs and containers that are available for different architectural roles of the system. Various embodiments of the present invention, through location program 200 and reporting program 300, can progressively allocate and reallocate the VM and container clusters.

Location program 200 provides the advantage of progressively reallocating processing resources as time progresses and users utilize and contribute to a workload across different geographies (e.g., "follow the sun"). For example, in a message application that includes a channel defined to maintain support for a service, people will work and collaborate in the same time window and location (e.g., time zone) until a next time window and location becomes available. Accordingly, users communicate data (e.g., pictures, text, files, messages, etc.) from a similar geographic location and as time passes, users from different geographies will start joining and communicating in the channel of the messaging application. Accordingly, as time passes the workload changes and more data will originate from different geographies. Embodiments of the present invention recognize the benefits of locating VM and container resources in the geographic locations of the collaborating users. Location program 200 tracks the shift in geographies and can increase availability of VMs and containers in the new geographies, while the amount of users in the new geographies are increasing, and concurrently reduce availability of VMs and containers in the previous geographies, while the amount of users in the previous geographies are decreasing.

FIG. 3 is a flowchart depicting operational steps of reporting program 300, a program for determining whether to relocate processing resources associated with supporting a client impact event, in accordance with an embodiment of the present invention. In one embodiment, reporting program 300 initiates in response to receiving information indicating a client impact event. For example, reporting program 300 determines that a user (e.g., of client device 110N) sends a message (that is received by management server 140) that indicates an occurrence of a client impact event. In another embodiment, reporting program 300 waits until receipt of an indication of a client impact event.

In step 302, reporting program 300 receives information associated with a client impact event. In one embodiment, reporting program 300 receives information indicating that a client impact event is occurring via an incident reporting tool (e.g., application 114N on client device 110N). In various embodiments of the present invention, a client impact event can be representative of any reported event or incident that impacts operability of an environment for a user. For example, reporting program 300 receives an incident report for a environment, application, or tool, which management server 140 supports.

In decision step 304, reporting program 300 determines whether the client impact event requires action from users or a component within a specific location. In one embodiment, reporting program 300 parses the received information related to the client impact event (step 302) to identify an environment associated with the client impact event (e.g., the customer environment) and policies associated with the customer. In various embodiments of the present invention, some policies and regulations associated with a customer environment can specify that support for the environment is performed by individuals within a specific geography, or by individuals with a specific skill (that are located in specific geographic locations). In additional embodiments, information associated with the environment, or the client impact event, can require use of a specific component that is only available in certain geographies. Accordingly, based on parsing and analyzing relevant policies, regulations, information associated with the environment, and information associated with the client impact event for indications of requirements associated with a specific geographic location, reporting program 300 determines whether the client impact event requires action from users or a component within a specific location (e.g., satisfies a relevant policy, etc.).

In additional embodiments, reporting program 300 analyzes reported configurations associated with the environment of the client impact event to determine whether the environment is associated with any location-specific requirements, or whether an issue requires a user or team that resides in particular locations (e.g., based on skills). In an example embodiment, if reporting program 300 does not identify information that indicates a location-specific requirement, then reporting program 300 determines that the client impact event does not require action from users or a component within a specific location. More specifically, in response to determining that the client impact event does not require action from users or a component within a specific location (decision step 304, NO branch), reporting program 300 returns to the start and waits for another indication of a client impact event (step 302). In an alternate embodiment, in response to determining that the client impact event does not require action from users or a component within a specific location (decision step 304, NO branch), reporting program 300 ends.

In decision step 306, reporting program 300 determines whether to relocate resources. In one embodiment, reporting program 300 determines whether to dynamically reallocate processing resources that are associated with resolving the client impact event. In example embodiments, reporting program 300 utilizes the location-specific requirements associated with the client impact event and corresponding environment (from step 304) to identify a processing location (e.g., server 120, server 130, etc.) that meets the location-specific requirements (or is within a defined proximity to a required person, team, or geography). In addition, reporting program 300 can identify a processing location that is currently providing resources to resolve the client impact event (e.g., a current set of provisioned VMs and containers). Accordingly, reporting program 300 determines whether to relocate at least some processing resources (e.g., VMs and containers) from the processing location that is currently providing resources to the processing location that meets the determined location-specific requirements. In another embodiment, reporting program can utilize network latency information to determine whether to relocate processing resources.

In response to determining not to relocate processing resources (decision step 306, NO branch), reporting program 300 returns to the start and waits for another indication of a client impact event (step 302). In an alternate embodiment, in response to determining not to relocate processing resources (decision step 306, NO branch), reporting program 300 ends.

In step 308, reporting program 300 relocates processing resources. More specifically, in response to determining to relocate processing resources (decisions step 308, YES branch), reporting program 300 dynamically relocates processing resources across geographic locations. In various embodiments of the present invention, reporting program 300 can relocate all, or a portion of, processing resources associated with resolving the client impact event, such as VMs and containers.

In an example scenario, reporting program 300 determines that the client impact event is supported by a team of individuals (e.g., with a specific skill set and access to specific components) that are located in Germany. Reporting program 300 identifies server 130, which is located in Germany and is capable of providing support to resolve the client impact event utilizing VMs and containers from resource pool 132. Reporting program 300 determines that server 120, which is located in Japan, is currently provisioned with VMs and containers to support resolution of a client impact event. In this example scenario, reporting program 300 determines whether the geographic location of server 120 meets the location-specific requirements to resolve the client impact event.

In this example scenario, if reporting program 300 determines that the geographic location of server 120 does not meet the location-specific requirements to resolve the client impact event, then reporting program 300 determines to relocate processing resources (decision step 306, YES branch). Accordingly, reporting program 300 determines that server 130 does meet the location specific requirements and reporting program 300 dynamically provisions VMs and containers in resource pool 132 of server 130 to support resolution of the client impact event. In this scenario, the team of individuals (e.g., with a specific skill set and access to specific components) that are located in Germany can utilize processing resources of server 130 (i.e., VMs and containers in resource pool 132) to work to resolve the client impact event. Embodiments of the present invention provide the advantage of dynamically provisioning resources to improve processing associated with resolving an issue (e.g., reduce network latency). In another embodiment, reporting program 300 can reduce or remove the amount of provisioned resources in server 120 in response to relocating some processing resources to server 130.

Figure 4:
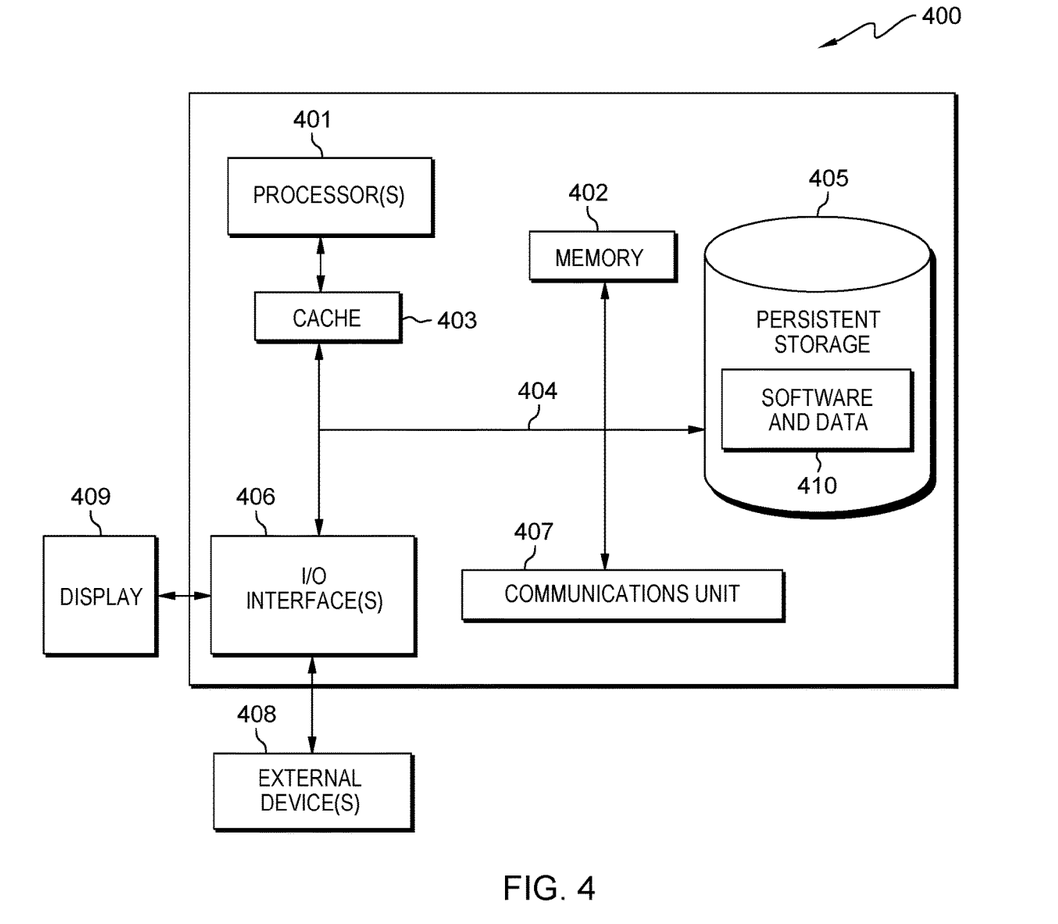
FIG. 4 depicts a block diagram of components of a computing system representative of the client devices, management server, and servers of FIG. 1, in accordance with an embodiment of the present invention.

FIG. 4 depicts computer system 400, which is representative of client device 110A, client device 110B through client device 110N, server 120, server 130, and management server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 110A through client device 110N, software and data 410 includes respective instances of user interface 112A through user interface 112N, application 114A through application 114N, and location information 116A through location information 116N. With respect to server 120, software and data 410 includes resource pool 122, such as VMs and containers. With respect to server 130, software and data 410 includes resource pool 132, such as VMs and containers. With respect to management server 140, software and data 410 includes location program 200 and reporting program 300.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
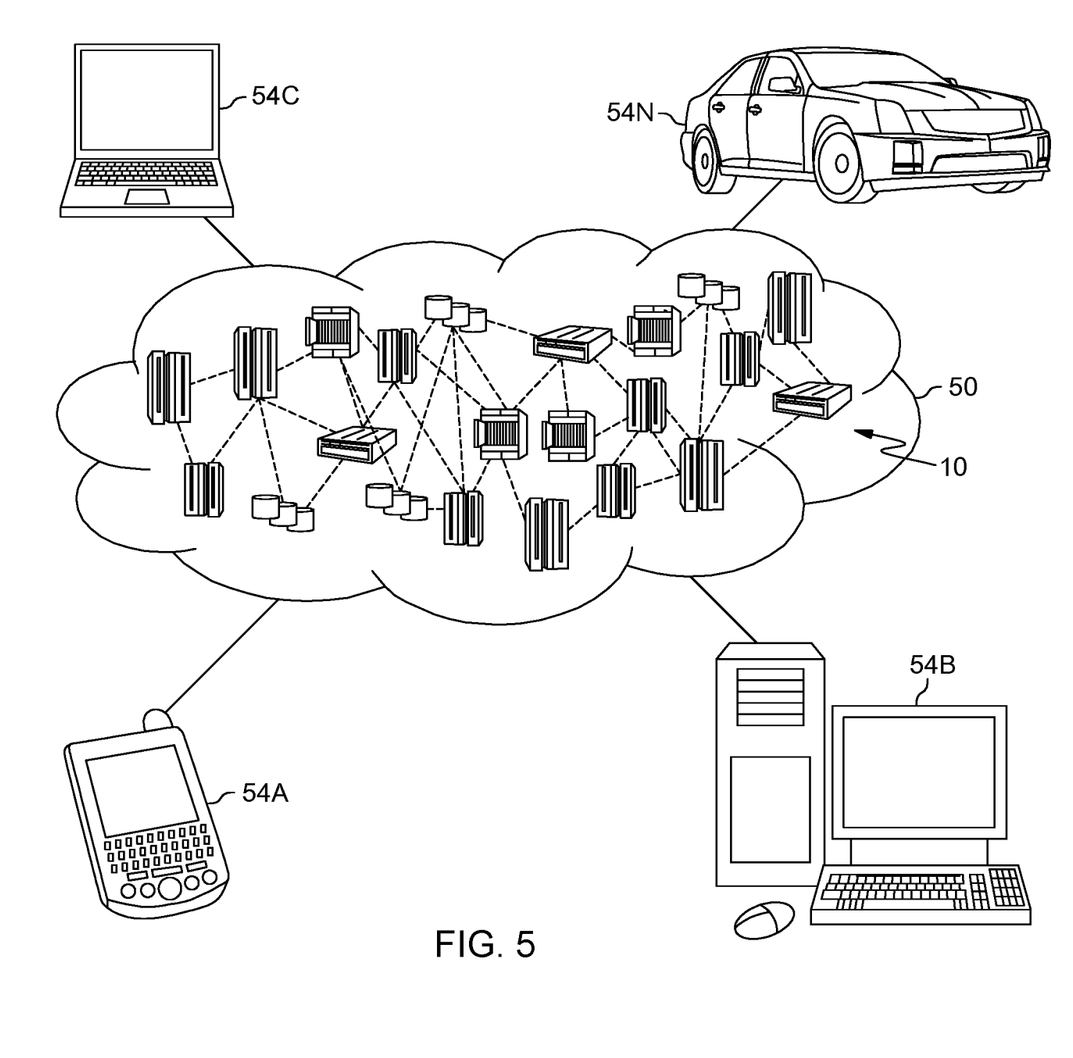
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
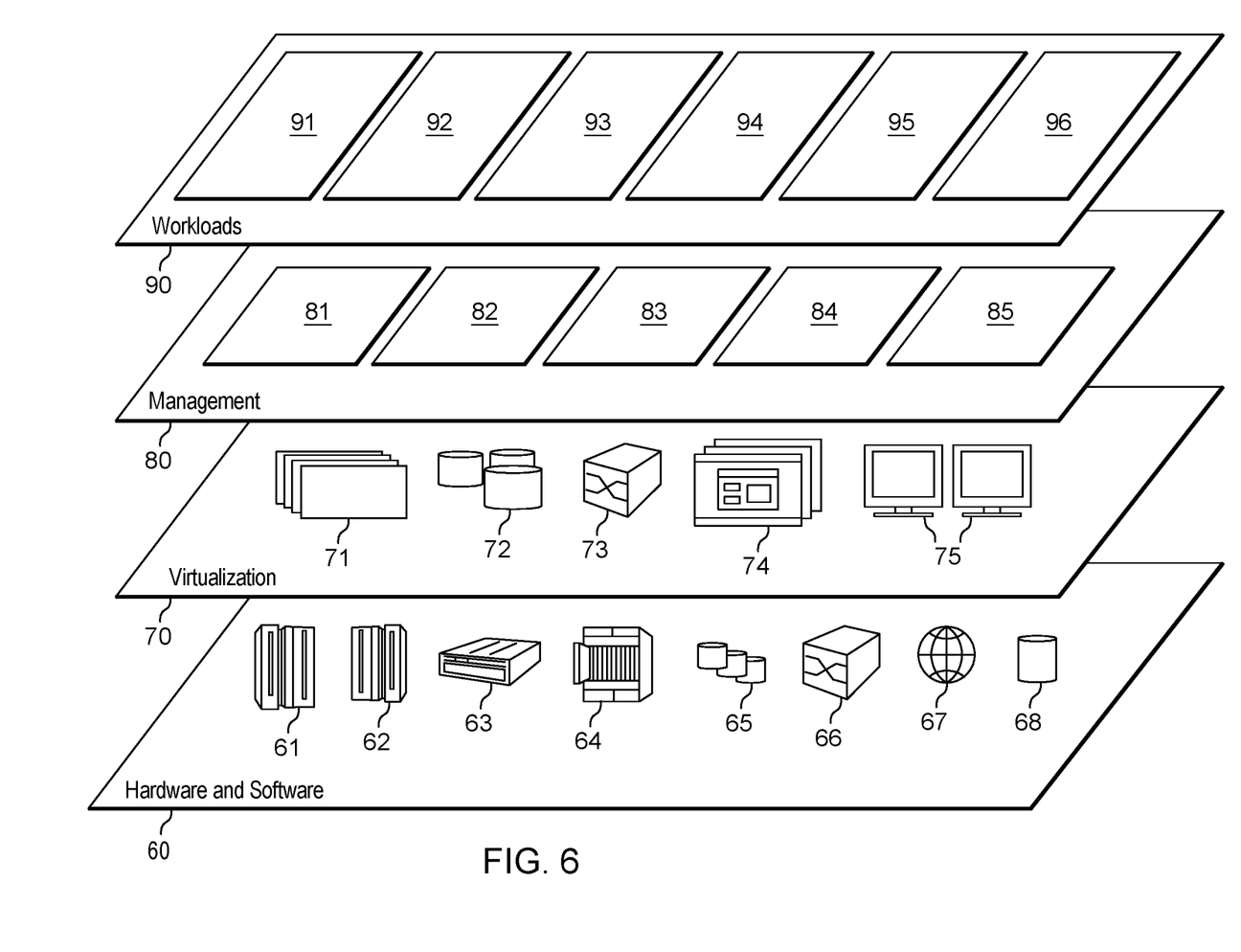
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software 96. In various embodiments of the present invention, software 96 is representative of location program 200 and reporting program 300, or corresponding processing capabilities, described in further detail respectively with regard to FIG. 2 and FIG. 3.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, a request to process data associated with a workload, wherein:
      the request includes data to process utilizing the workload; and
      processing resources of a first network accessible computing system, located at a first geographic location, are allocated to execute the identified request and the corresponding workload;
   determining, by one or more processors, an originating geographic location of the identified request, wherein the originating geographic location is a second geographic location;
   determining, by one or more processors, a data size corresponding to executing the identified request, wherein the data size is a size associated with the data included within the request that is added to the workload;
   aggregating, by one or more processors, real-time usage data for the workload, the real-time usage data including a size of data processed for the workload from computing devices associated with the first geographic location, and a size of data processed for the workload from computing devices associated with the second geographic location;
   identifying, by one or more processors, a second network accessible computing system, located at the second geographic location;
   determining, by one or more processors, whether to relocate at least a portion of processing resources allocated to execute the identified request and the corresponding workload from the first network accessible computing system to the second network accessible computing system, based on the aggregated real-time usage data; and
   progressively reallocating, by one or more processors, at least the portion of processing resources allocated to execute the identified request and the corresponding workload from the first network accessible computing system responsive to a shift in geographies, wherein the shift of geographies represents the increased availability of virtual machines (VMs) and containers in new geographies and the concurrent reduced availability of VMs and containers in previous geographies while users in the previous geographies decrease.

2. The method of claim 1, wherein determining whether to relocate at least a portion of processing resources allocated to execute the identified request and the corresponding workload from the first network accessible computing system to the second network accessible computing system, further comprises:

in response to determining that an aggregated amount of data processing on requests to process data received from the second geographic location meets a data size threshold condition, relocating, by one or more processors, an allocation of at least a portion of processing resources from the first network accessible computing system to the second network accessible computing system.

3. The method of claim 1, further comprising:

determining, by one or more processors, a ratio of aggregated data processing amounts for the first network accessible computing system relative to the second network accessible computing system; and in response to determining to relocate at least a portion of processing resources allocated to execute the identified request and the corresponding workload from the first network accessible computing system to the second network accessible computing system, reallocating, by one or more processors, processing resources that are allocated to execute the request between the first network accessible computing system and the second network accessible computing system.

4. The method of claim 1, wherein the processing resources of the first network accessible computing system and the second network accessible computing system are selected from the group consisting of: virtual machines (VMs) and containers.

5. The method of claim 1, wherein the identified request is associated with a collaboration among users, and wherein the workload includes communicating data among the users.

6. The method of claim 1, wherein identifying a second network accessible computing system further comprises:

identifying, by one or more processors, the second network accessible computing system based on network latency between the second network accessible computing system and the determined second geographic location.

7. A computer program product comprising:

one or more computer readable storage media and program instructions stored on the one or more computer readable storage media, the program instructions comprising:

program instructions to identify a request to process data associated with a workload, wherein:

the request also includes data to process utilizing the workload; and processing resources of a first network accessible computing system, located at a first geographic location, are allocated to execute the identified request and the corresponding workload;

program instructions to determine an originating geographic location of the identified request, wherein the originating geographic location is a second geographic location;

program instructions to determine a data size corresponding to executing the identified request, wherein the data size further includes a size associated with the data included within the request that is added to the workload;

program instructions to aggregate real-time usage data for the workload, the real-time usage data including a size of data processed for the workload from computing devices associated with the first geographic location, and a size of data processed for the workload from computing devices associated with the second geographic location;

program instructions to identify a second network accessible computing system, located at the second geographic location;

program instructions to determine whether to relocate at least a portion of processing resources allocated to execute the identified request and the corresponding workload from the first network accessible computing system to the second network accessible computing system, based on the aggregated real-time usage data; and program instructions to progressively reallocate at least the portion of processing resources allocated to execute the identified request and the corresponding workload from the first network accessible computing system responsive to a shift in geographies, wherein the shift of geographies represents the increased availability of virtual machines (VMs) and containers in new geographies and the concurrent reduced availability of VMs and containers in previous geographies while users in the previous geographies decrease.

8. The computer program product of claim 7, wherein the program instructions to determine whether to relocate at least a portion of processing resources allocated to execute the identified request and the corresponding workload from the first network accessible computing system to the second network accessible computing system, further comprise program instructions to:

in response to determining that an aggregated amount of data processing on requests to process data received from the second geographic location meets a data size threshold condition, relocate an allocation of at least a portion of processing resources from the first network accessible computing system to the second network accessible computing system.

9. The computer program product of claim 7, further comprising program instructions, stored on the one or more computer readable storage media, to:

determine a ratio of aggregated data processing amounts for the first network accessible computing system relative to the second network accessible computing system; and in response to determining to relocate at least a portion of processing resources allocated to execute the identified request and the corresponding workload from the first network accessible computing system to the second network accessible computing system, reallocate processing resources that are allocated to execute the request between the first network accessible computing system and the second network accessible computing system.

10. The computer program product of claim 7, wherein the processing resources of the first network accessible computing system and the second network accessible computing system are selected from the group consisting of: virtual machines (VMs) and containers.

11. The computer program product of claim 7, wherein the program instructions to identify a second network accessible computing system further comprise program instructions to:

identify the second network accessible computing system based on network latency between the second network accessible computing system and the determined second geographic location.

12. A computer system comprising:

one or more computer processors;

one or more computer readable storage media; and
program instructions stored on the computer readable storage media for execution by at least one of the one or more processors, the program instructions comprising:
program instructions to identify a request to process data associated with a workload, wherein:
the request also includes data to process utilizing the workload; and
processing resources of a first network accessible computing system, located at a first geographic location, are allocated to execute the identified request and the corresponding workload;
program instructions to determine an originating geographic location of the identified request, wherein the originating geographic location is a second geographic location;
program instructions to determine a data size corresponding to executing the identified request, wherein the data size further includes a size associated with the data included within the request that is added to the workload;
program instructions to aggregate real-time usage data for the workload, the real-time usage data including a size of data processed for the workload from computing devices associated with the first geographic location, and a size of data processed for the workload from computing devices associated with the second geographic location;
program instructions to identify a second network accessible computing system, located at the second geographic location;
program instructions to determine whether to relocate at least a portion of processing resources allocated to execute the identified request and the corresponding workload from the first network accessible computing system to the second network accessible computing system, based on the aggregated real-time usage data; and
program instructions to progressively reallocate at least the portion of processing resources allocated to execute the identified request and the corresponding workload from the first network accessible computing system responsive to a shift in geographies, wherein the shift of geographies represents the increased availability of virtual machines (VMs) and containers in new geographies and the concurrent reduced availability of VMs and containers in previous geographies while users in the previous geographies decrease.

13. The computer system of claim 12, wherein the program instructions to determine whether to relocate at least a portion of processing resources allocated to execute the identified request and the corresponding workload from the first network accessible computing system to the second network accessible computing system, further comprise program instructions to: in response to determining that an aggregated amount of data processing on requests to process data received from the second geographic location meets a data size threshold condition, relocate an allocation of at least a portion of processing resources from the first network accessible computing system to the second network accessible computing system.

14. The computer system of claim 12, further comprising program instructions, stored on the computer readable storage media for execution by at least one of the one or more processors, to:
determine a ratio of aggregated data processing amounts for the first network accessible computing system relative to the second network accessible computing system; and
in response to determining to relocate at least a portion of processing resources allocated to execute the identified request and the corresponding workload from the first network accessible computing system to the second network accessible computing system, reallocate processing resources that are allocated to execute the request between the first network accessible computing system and the second network accessible computing system.

15. The computer system of claim 12, wherein the processing resources of the first network accessible computing system and the second network accessible computing system are selected from the group consisting of: virtual machines (VMs) and containers.

16. The computer system of claim 12, wherein the identified request is associated with a collaboration among users, and wherein the workload includes communicating data among the users.

17. The computer system of claim 12, wherein the program instructions to identify a second network accessible computing system further comprise program instructions to:
identify the second network accessible computing system based on network latency between the second network accessible computing system and the determined second geographic location.

18. The method of claim 1, wherein the aggregated real-time usage data for the workload includes the size of data processed for the workload over a defined period of time.

19. The computer program product of claim 7, wherein the aggregated real-time usage data for the workload includes the size of data processed for the workload over a defined period of time.

20. The method of claim 1, wherein the data is one or more files included with the request.

* * * * *